United States Patent Office 3,484,250

Patented Dec. 16, 1969

3,484,250

PREPARATION OF A COATED READY-TO-EAT CEREAL

Willard L. Vollink and Melvin A. Ver Steeg, Battle Creek, Mich., assignors to General Foods Corporation, White Plains, N.Y., a corporation of Delaware

No Drawing. Continuation-in-part of application Ser. No. 432,810, Feb. 15, 1965. This application Dec. 23, 1965, Ser. No. 516,147

Int. Cl. A23l *1/18*

U.S. Cl. 99—83 5 Claims

ABSTRACT OF THE DISCLOSURE

A ready-to-eat puffed cereal with improved crispness upon rehydration has been prepared. The product is prepared by applying a liquefied fat to the surface of the puffed cereal and then toasting the cereal, thereby causing the fat to impregnate the cereal.

This application is a continuation-in-part of now abandoned U.S. application Ser. No. 432,810 filed Feb. 15, 1965 for Improved Food Product and Process.

The present invention relates to ready-to-eat cereals and more particularly, to ready-to-eat cereals having improved crispness.

Ready-to-eat cereals are normally made by one of three basic techniques, namely, gun puffing, oven puffing, or flaking. Regardless of the method by which the cereal is prepared, however, and particularly in the case of puffed products, the cereal usually becomes quite soggy by the time the consumer is eating the last portion of a bowl of cereal and lacks desired toasted color and flavor. In the case of sugar coated cereals, the coating assists to some degree in maintaining crispness but since sugar is itself soluble in the hydrating medium, e.g., milk or cream, the benefits of the sugar coating are only temporary.

It is, therefore, an object of the present invention is to provide ready-to-eat puffed or flaked cereals having improved crispness. Another object is to provide a more uniformly toasted ready-to-eat puffed or flaked cereal having improved color and flavor. A further object is to provide a method for preparing ready-to-eat puffed cereals having improved crispness. These and other objects of the present invention will become apparent as the description proceeds.

It has now been found that ready-to-eat puffed cereals having improved crispness, flavor and taste may be prepared by toasting a puffed or flaked cereal product having a coating of from about 1.5% to about 20% of an edible hydrophobic material based on the total weight of the cereal on which coating a level of powderous sugar is preferably applied prior to toasting when the fat is employed at a level in excess of 5%.

The edible hydrophobic material may consist of triglycerides, i.e., animal or vegetable fats or oils, or mixtures of triglycerides with mono- and diglycerides. Those fats or oils which are liquid at room temperature or which have melting points of up to about 125° F. are suitable for use according to the present invention. At lower use levels, that is, up to about 5% by weight, the fat preferably should have a melting point of from about 110° F. to about 125° F. At these lower use levels, the higher melting point fatty material will effectively retain crispness without imparting any undesirable mouth-feel. At higher use levels, that is, from about 5% up to about 20% by weight, lower melting point fats or oils are preferred. In this case, the fats and oils may be selected from those materials which are normally liquid at room temperature as well as those which melt at temperatures of up to about 110° F. The addition of fat or oil at a level of about 2% by weight increases by about 40% the time during which the puffed cereal remains crisp after hydration.

The incorporation of fats or oils may impart an undesirable taste and mouth feel to the ready-to-eat cereal. Toasting the cereal, however, after the fat or oil has been applied thereto causes the fat or oil to be dispersed throughout the cellular structure of the cereal. This dispersion throughout the cereal product provides improved crispness retention upon hydration and minimizes any undesirable taste. The presence of the fat or oil also increases the rate of heat transfer during toasting thereby improving the flavor and taste of the product by providing faster and more uniform toasting.

When the cereal is to be treated with higher levels of fats or oils, that is, from about 5% to about 20% by weight, it is preferred to employ therewith an amount of sugar generally equal in weight to that of the fat or oil, the sugar in powder form being applied to cereal after application of the hydrophobic material thereto, and the thus sugar-dusted cereal being thereafter toasted. The sugar dilutes the fatty mouth feel that would normally result from these high fat or oil levels and the fusion of the fat and sugar during the toasting operation provides a desirable mouth feel without impairment of the desired crispness retention upon hydration provided by the high fat or oil content.

In carrying out the process of the present invention, the puffed cereal is coated with the edible hydrophobic material by any convenient means, for example, by spraying, and is then toasted. Preferably, heat is applied during the coating operation in order to reduce any build up of edible hydrophobic material on the coating apparatus. It is a particular feature of the present invention that it is applicable to puffed cereal products made from cereals other than rice as well as rice.

However the invention is applicable to ready-to-eat breakfast cereal products in flaked, as well as puffed form, and in the case of a puffed cereal product, can be used to improve the crispness, flavor and color of gun-puffed, as well as oven puffed products, it being contemplated hereby that conventional breakfast cereal products in ready-to-eat form, either puffed or flaked, can be incompletely toasted; have the hydrophobic material applied either with or without sugar, depending upon the level of fat desired and thereafter finally toasted to achieve the dispersion of the hydrophobic fat or oil throughout the cellular structure of the cereal.

The following examples illustrate the present invention without, however, limiting the same thereto.

EXAMPLE I

The following example illustrates large scale production of the ready-to-eat cereal of the present invention in puffed form. 100 lbs. of corn flour was mixed with a flavoring syrup comprising 3.2 lbs. of sugar, 7.8 lbs. of malt syrup, 3.2 lbs. of salt, and 23.4 lbs. of water to form a granular mixture having a moisture content of approximately 26%. The mixture was then cooked in a closed pressure vessel at approximately 20 p.s.i.g. for about 18 minutes. After being cooked, the mixture was air cooled and pelletized into cylindrical pellets having dimensions of approximately $\frac{7}{64}''$ x $\frac{9}{64}''$. The moisture content of the cooked pellets was between 25% and 28%.

The pellets were then case hardened by blowing ambient air therethrough for a period of 8–9 minutes. The case hardened pellets had a moisture content between 16% and 21%.

The case hardened pellets were then bumped through flaking rolls and placed immediately into a stream of air having a temperature of approximately 600° F. and an air velocity of about 1000 f.p.m. for 10 seconds. The puffed pellets were then toasted in an air convection dryer at temperatures ranging from 275–300° F. for 4 minutes. The final product was a light, golden-brown puffed corn product having a volume from 1.5 to 3 times that of the bumped pellets coming from the flaking rolls.

The puffed corn product produced as described in the foregoing example was coated by the following method. 8.5 ounces of hydrogenated vegetable oil were melted at 150° F.–160° F. and sprayed on 35 ounces of corn puffs which were being tumbled in a warm coating reel. Heat was applied to the reel during spraying to reduce fat buildup. 4.8 ounces of powdered sugar were dusted on the oil-coated corn puffs immediately after spraying. Tumbling was continued until an even coating was obtained and excess sugar was absorbed by the oil coating. The coated product was removed from the reel and cooled on a screen to room temperature, thereby allowing the oil to solidify. The coated product was then toasted at 400° F. for 20 seconds. The toasting operation fused the oil and sugar into a transparent, glaze-like coating. When cooled to room temperature, a quantity of the corn puffs equal to a normal serving were placed in a bowl with the normal amount of milk for one serving. The last portion of these corn puffs retained their crispness while the same amount of uncoated corn puffs became soggy very quickly after milk had been added.

The foregoing procedure was repeated three times with the exception that toasting was carried out for 25 seconds, 30 seconds and 35 seconds, respectively in these 3 runs. Results similar to those described above were obtained. The sample toasted for 35 seconds, however, was darker than the other samples.

EXAMPLE II

The procedure of the foregoing example was repeated using hydrogenated vegetable oil at a 2% level and omitting the sugar. The results obtained on hydrating the product were similar to those described in Example I.

EXAMPLE III

Three pounds of a conventional ready-to-eat corn-based cereal flakes were weighed and placed in a container. Eight ounces of powdered sugar (10X) were weighed and held in a metal beaker. Eight ounces of hydrogenated vegetable oil (melting point 114°–116° F.) were also weighed into a separate metal beaker. The oil was then melted on a warm stove to 130° F. The sugar and oil were each applied in total to the stated weight of cereal flakes in a uniform distribution as follows:

The oil coating was applied by placing the flakes in a warm (140° F.) dry revolving coating reel by spraying the hot oil directly onto the tumbling flakes within the reel. A hand-held pneumatic spray gun with an adjustable nozzle was used to provide the finest atomization possible. Immediately following the oil application to the flakes, the powdered sugar was applied by sifting the sugar through an ordinary kitchen strainer held directly over the tumbling flakes within the reel. Tumbling was continued for approximately a minute following the sugar dusting operation, to assure that all the oil coated flakes were uniformly coated with sugar.

Following the coating operation, the product was removed from the coating reel and placed on a metal screen with a uniform bed depth of approximately ¾ inch. The product was then given a final toasting in an electric oven at 400° F. for 20 seconds, using an updraft air flow. A final cooling step was applied, bringing the product to room temperature, and it was then stored in a covered container.

EXAMPLE IV

Three pounds of gun-puffed, oat-based animal shapes were coated with eight ounces hydrogenated vegetable oil and eight ounces of powdered sugar in the same manner as described in III.

EXAMPLE V

Three pounds of corn-based gun-puffed cereal were coated with eight ounces of hydrogenated vegetable oil and eight ounces powdered sugar in the same manner as described in III.

EXAMPLE VI

Three pounds of oat-based ready-to-eat cereal flakes were coated with eight ounces hydrogenated vegetable oil and eight ounces powdered sugar in the same manner as described in Example III.

The product of the foregoing Examples III–VI was tested for crispness retention in the following manner: 1 oz. of the product in a bowl and added to it 4 oz. of cold (48° F.) milk and the samples were timed by a panel of tasters for a period during which the product retained its desired crispness. Crispness retention being measured against a control in each example consisting of the uncoated cereal counterpart.

CRISPNESS RETENTION TIME IN SECONDS

| Example | Product | Uncoated | Coated |
|---|---|---|---|
| III | Corn flakes | 137.6 | 164.2 |
| IV | Gun-puffed animal shape | 135.8 | 178.3 |
| V | Corn-based gun-puffed cereal | 131.2 | 169.6 |
| VI | Oat flakes | 112.5 | 168.8 |

From the above it will be noted that the product retained its crispness in each instance for a substantial period of time.

What is claimed is:

1. A method of preparing a ready-to-eat cereal having improved crispness upon hydration comprising applying from about 1.5% to about 20% by weight of a liquefied edible hydrophobic fatty material having a melting point of not more than about 125° F. to a ready-to-eat cereal and toasting the cereal to impregnate the edible hydrophobic material therethrough.

2. A method according to claim 1 wherein the edible hydrophobic material is applied to the cereal by means of spraying.

3. A method according to claim 1 wherein the cereal treated is of the puffed type.

4. A method according to claim 1 wherein the cereal treated is of the flaked type.

5. A method according to claim 1 wherein the hydrophobic fatty material is applied at a level of at least 5% and a powderous sugar is thereafter dusted on the thus coated cereal prior to toasting.

References Cited

UNITED STATES PATENTS

| | | | |
|---|---|---|---|
| 2,868,647 | 1/1959 | Vollink | 99—83 |
| 3,094,947 | 6/1963 | Green et al. | 99—83 XR |
| 3,246,990 | 4/1966 | Thompson et al. | 99—82 |

RAYMOND N. JONES, Primary Examiner

U.S. Cl. X.R.

99—80, 81, 82